Oct. 24, 1961     C. C. JENSEN     3,005,556
FILTER
Filed Aug. 19, 1957     2 Sheets-Sheet 1
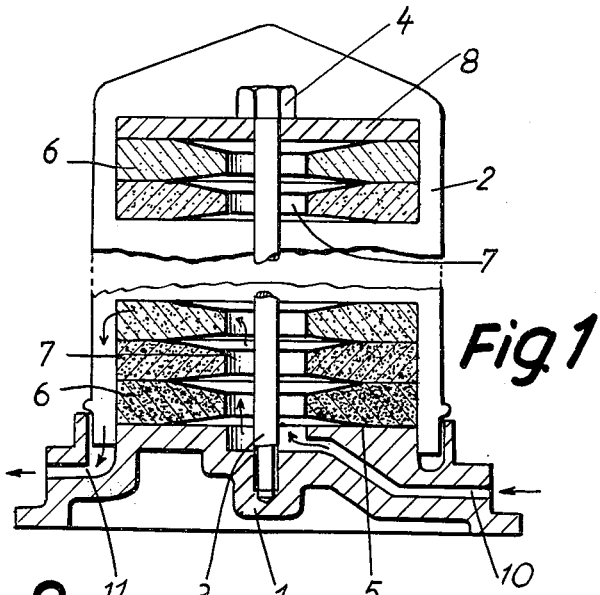
Fig. 1
Fig. 2     Fig. 3
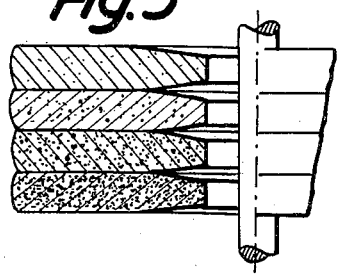
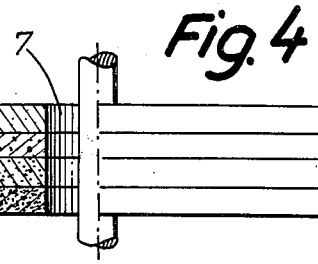
Fig. 4
Carl Christian Jensen
by Jean Laurence

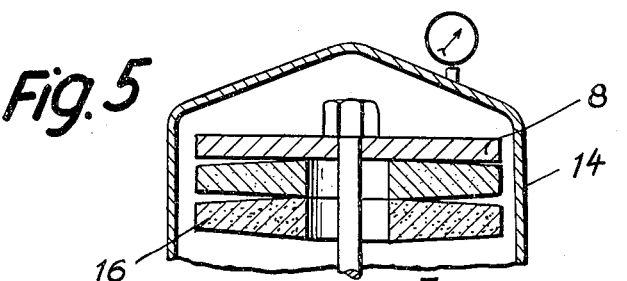
Fig. 5
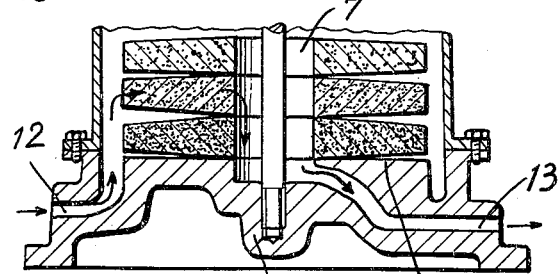
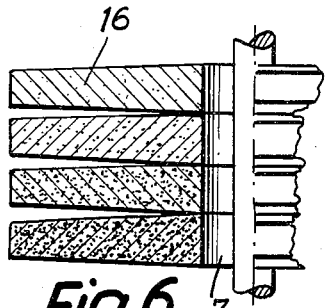
Fig. 6
Fig. 7
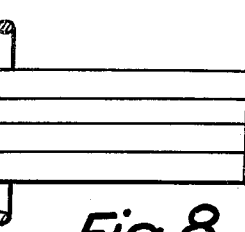
Fig. 8

3,005,556
FILTER
Carl Christian Jensen, Svendborg, Denmark
Filed Aug. 19, 1957, Ser. No. 678,932
6 Claims. (Cl. 210—488)

The invention relates to a filter having a filter body with filter discs of porous material and of the kind having a central hole and being mounted in the filter body in such manner that the liquid to be filtered enters the filter body at its inner part and penetrating the discs leaving the filter body at its outer part or conversely, the said filter discs being assembled to form the filter body or a packet by means of two rigid plates.

There are known filters of this kind having filter discs each of which consists of two discs of comparatively rigid filter material that are held together by a ring in the centre, each double plate formed in this manner being separated from the next one by means of a ring mounted at the periphery.

There are also known filters with filter discs which are of uniform thickness from the hole in the centre to the periphery and which are placed on top of each other without any kind of intermediary layers whatever. Finally, there are known filter discs which are provided with a projecting bead along their periphery.

All of the known filter discs have the drawback that the discs have pores of uniform size, and this involves that the impurities to be separated from the liquid accumulated substantially at the point where the liquid enters the filter material, whereby the liquid will relatively soon be prevented from penetrating.

It is the object of the invention to provide a filter which has no such drawback, and this is accomplished thereby that the material in the filter discs by being subjected to varying compression having such a structure that the cross-section of the pores is reduced in the direction of the liquid flow.

In a filter of such a design the pores will be of the greatest size at the point where the dirty liquid enters the filter material and will decrease uniformly in size towards the part of the filter discs from which the liquid is discharged. In this manner the impurities separated off may be uniformly distributed in the filter material, the greater particles being intercepted at the coarse pores whereas the finer particles pass the said pores and are only intercepted further inside the filter material where the pores are smaller. This increases the effect of the filter and the filter material is better utilised. This effect is achieved in very simple manner by subjecting the material to the action of varying pressures either during manufacturing the discs or by mounting the discs in the filter so that the cost of the filter discs is not increased.

A suitable embodiment of a filter of the said kind may consist of filter discs which before they are assembled are of a thickness increasing in the direction of the liqud flow, but which are assembled in the filter between plates having flat surfaces.

According to the invention a suitable embodiment of a filter may also consist of filter discs which prior to their assembly are of uniform thickness but are assembled between non-plane plates the cross-section of which in the direction towards the filter discs is limited by a line that rises uniformly in the direction of the liquid flow.

The disclosed embodiments of a filter according to the invention have filter discs which prior to their mounting in the filter have pores of uniform size, after which the said discs by being assembled in the filter are subjected to the compression previously referred to, whereby the varying pore size is provided. A filter according to the invention may, however, also be made of filter discs which prior to their mounting in the filter have pores of varying size, and according to the invention such a filter disc may be made in the manner that the filter material is treated by mechanical means or by other suitable means in such a manner that the compression of the material increases from the central part to the peripheral part or conversely, the material being subsequently fixed so that the varying pore sizes produced by the varying compression are retained when the pressure is relieved.

The said method may according to the invention be carried out in such manner that a filter disc blank of irregular thickness is compressed between plates with plane surfaces.

The method may also be carried out in such manner that a filter disc blank of uniform thickness is compressed between plates having non-plane surfaces.

The compression of the filter disc may, both in filter discs that are compressed in the filter proper or prior to being mounted in same, be such that the pressure varies along a straight line.

The compression may, however, also vary along a curve, for example an arc of a circle.

Various embodiments of a filter in accordance with the invention will be described in the following with reference to the drawing, in which FIGURE 1 is a section through a filter for feeding at its central part and for discharging at its periphery, FIGURES 2–4 show a part of a filter element at three stages of the compression, FIGURE 5 is a section through a filter for feeding at its periphery and for discharging at its central part, and FIGURES 6–8 are the same as FIGURES 2–4 of the embodiment disclosed in FIGURE 5.

The filter according to FIGURE 1 consists of a frame 1 with a casing 2 and a vertically disposed bolt 3 screwed into a threaded hole of the frame and provided with a nut 4 at its upper end. The frame 1 has a flat surface 5 on which is placed an element consisting of a pile of filter discs 6 of porous, compressible material.

The filter discs 6 are circular and have a central hole 7 through which the bolt 3 extends, and as will appear from FIGURES 1 and 2 the discs are thicker along their periphery than at their central part, their surfaces being conical. On top of the pile is mounted a flat compression plate 8, and as will be evident from FIGURE 1, tightening of the nut 4 will cause the filter discs to be tightly assembled so that the conical surfaces will become flat.

This assembly is illustrated in FIGURES 2–4, FIGURE 2 showing the filter before compression, and as will be seen there are spaces 9 between the discs, which spaces are largest at the central part of the discs. FIGURE 3 shows the condition of the discs at a certain stage of the compression in which the spaces have become smaller. FIGURE 4 shows the discs in their fully compressed condition in which the spaces are entirely eliminated and the discs furthermore so firmly compressed that they have become of substantially less thickness than prior to their assembly.

In the said tightly assembled state the pressure action is substantially greater at the preiphery of the discs than at their central part, and the pore size of the material will therefore be less at the peripheral part than at the central part, and the size of the pores will decrease uniformly from the central to the peripheral part of the discs. In this way the density of the filter varies uniformly from the central to the peripheral part, and the liquid to be filtered and which is introduced through the passage 10 and discharged through the passage 11 so that it penetrates the discs from their centre to their periphery will a first meet material with rather large pores and subsequently pores of decreasing size, which will cause a uniform deposit of impure particles through the entire filter discs.

FIGURE 5 shows another filter type in which the liquid enters the disc at the periphery through a feeding passage 12 and flows into the central holes 7 and hence to a discharge passage 13. In this case it is necessary to use a pressure-resistant casing 14 to be secured tightly to the frame 15.

The filter discs, which are denoted by 16, are of greater thickness at their central part and of smaller thickness at their periphery, and as is evident from FIGURES 6–8, they will be subjected to their greatest compression at their central part, whereby the pores at the periphery will be greater than those at the central part, and this corresponds to the said direction of the liquid flow which will thereby meet the largest pores first and the finest pores subsequently.

Instead of plane compression plates 8 it would be possible to use compression plates with non-plane pressure surfaces, for example with conical surface conforming to the filter discs 6 in FIGURE 2. The surface 5 of the frame 1 might be of the same shape. If so, filter discs might be used having parallel surfaces, and when assembled the said discs would then be subjected to the greatest pressure along their pheriphery, whereby the pores would become of a size increasing from the periphery to the central part.

Similarly, the compression plate 8 shown in FIGURE 5 and the surface 5 might be designed as a filter disc 16 in FIGURE 6, and with the use of comparatively thick filter discs the density of the pores provided at the assembly would be greater at the central part than at the periphery of the discs.

If filter discs are used which prior to being mounted in the filter are treated in such manner that the varying pore size is provided, the filter disc blanks may for instance be of the shapes disclosed in FIGURE 2 and 6, or they may be plane, and they may then be compressed by means of plane dies or dies which are conical as described with reference to the compression plates 8, after which the material of the filter discs may be fixed so as to retain the pore variation produced thereby for instance by a heating, cooling, drying process or the like.

Instead of compression plates or dies having conical pressure surfaces, that is, a cross-section with straight lines, other forms of compression plates may be used having a cross-section limited by curves, for example arcs of a circle, so that the pore variation does not follow a straight line but a curve, and it is thereby possible to obtain a variation in pore size in accordance with different laws, whereby the variation may be adapted to various requirements. If compression between flat compression plates or dies is used, the filter discs may be of such design that their surfaces deviate from a plane and a cone, their cross-section being limited by curves.

What I claim and desire to secure by Letters Patent is:

1. In a liquid filter, a tube-shaped filter body comprising a plurality of juxtaposed discs arranged in directly abutting relation to each other in a column and composed of compressible porous material, the thickness of each disc in normally uncompressed condition increasing continuously in the direction of liquid flow through said filter body, relatively movable rigid plate members positioned at opposite ends of said column in substantially parallel relation to each other, selectively adjustable tightening means engaging at least one of said plate members to produce relative movement of said plate members and thereby regulate the degree of compression exerted by said plate members upon said discs to cause a major area of each of the respective facing surfaces of adjacent discs to be in direct contact with each other and to cause the pores in said compressible material to be controllably reduced in size progressively in the direction of liquid flow.

2. A liquid filter as defined in claim 1 in which the contour of the cross section of each disc in normally uncompressed condition consits of straight lines.

3. A liquid filter as defined in claim 1 in which the contour of the cross section of each disc in normally uncompressed condition consits of flat arches and straight lines.

4. In a liquid filter, a tube-shaped filter body comprising a plurality of juxtaposed discs composed of compressible porous material and arranged in a column in directly abutting relation to each other, each disc being under compression, the thickness of each disc in normally uncompressed condition increasing continuously in the direction of liquid flow through said filter, the normally thicker portion of each disc being under greater compression than the normally thinner portion thereof, said discs being compressed between relatively movable substantially parallel rigid plate members positioned at opposite ends of said column, selectively adjustable tightening means engaging at least one of said plate members and regulating the degree of compression exerted by said one plate upon said discs to cause a major area of each of the respective facing surfaces of adjacent discs to be in direct contact with each other, whereby the pores in said compressible material are controllably reduced in size progressively in the direction of liquid flow.

5. A filter according to claim 4 wherein the thickness of each disc in normally uncompressed condition is greater at the periphery than at the center thereof.

6. A filter according to claim 4 wherein the thickness of each disc in normally uncompressed condition is greater at the central portion than at the periphery thereof.

References Cited in the file of this patent

UNITED STATES PATENTS

| | | |
|---|---|---|
| 730,485 | Simoneton | June 9, 1903 |
| 1,677,892 | Herbert et al. | July 24, 1928 |
| 2,322,772 | Pennebaker | June 29, 1943 |
| 2,670,851 | Curtis | Mar. 2, 1954 |
| 2,692,686 | Fleck et al. | Oct. 26, 1954 |

FOREIGN PATENTS

| | | |
|---|---|---|
| 400,030 | Italy | Nov. 23, 1943 |